(12) United States Patent
Yang et al.

(10) Patent No.: US 10,446,884 B2
(45) Date of Patent: Oct. 15, 2019

(54) THREE-ELECTRODE TEST CELL

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Martin S. Ruthkosky, Sterling Heights, MI (US); Fang Dai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 250 days.

(21) Appl. No.: 15/295,600

(22) Filed: Oct. 17, 2016

(65) Prior Publication Data

US 2018/0108952 A1 Apr. 19, 2018

(51) Int. Cl.
*H01M 10/48* (2006.01)
*H01M 10/0525* (2010.01)

(52) U.S. Cl.
CPC ....... *H01M 10/48* (2013.01); *H01M 10/0525* (2013.01)

(58) Field of Classification Search
CPC . H01M 10/48; H01M 2/0222; H01M 10/0525
See application file for complete search history.

(56) References Cited

U.S. PATENT DOCUMENTS

| 8,163,410 B2 | 4/2012 | Fulop et al. |
| 2006/0013927 A1 | 1/2006 | Geveke et al. |
| 2007/0117017 A1* | 5/2007 | Sugiyama ........... H01M 4/0407 429/231.95 |
| 2012/0135291 A1* | 5/2012 | Patoux .................. B01F 3/1242 429/149 |
| 2012/0176097 A1* | 7/2012 | Takezawa ............. H01M 4/386 320/134 |
| 2013/0089796 A1 | 4/2013 | Sun et al. |
| 2013/0323542 A1* | 12/2013 | Wijayawardhana .... H01M 4/00 429/50 |

FOREIGN PATENT DOCUMENTS

| CN | 202025833 | 11/2011 |
| CN | 203607508 U | * 5/2014 |
| CN | 107959056 A | 4/2018 |

OTHER PUBLICATIONS

C. Delacourt, Paul Ridgway, V. Srinivasan, and V. Battaglia, Measurements and Simulations of Electrochemical Impedance Spectroscopy of a Three-Electrode Coin Cell Design for Li-Ion Cell Testing, Journal of the Electrochemical Society, 161 (9) A1253-A1260, Published Jun. 5, 2014. (Year: 2014).*

(Continued)

*Primary Examiner* — Jonathan G Jelsma
(74) *Attorney, Agent, or Firm* — Harness, Dickey & Pierce, P.L.C.

(57) ABSTRACT

An example of a three-electrode test cell includes a negative electrode, a positive electrode having an aperture defined therein, a reference electrode, and a first microporous polymer separator soaked in an electrolyte. The reference electrode is disposed within the aperture of the positive electrode and physically separated from the positive electrode. The first microporous polymer separator is disposed between the negative electrode and the positive electrode.

19 Claims, 1 Drawing Sheet

(56) References Cited

OTHER PUBLICATIONS

Stefan Klink, Daniel Hoche, Fabio La Mantia, and Wolfgang Schuhmann, "FEM modelling of a coaxial three-electrode test cell for electrochemical impedance spectroscopy in lithium ion batteries", Journal of Power Sources 240, pp. 273-280, Available Apr. 12, 2013. (Year: 2013).*

Belt, et al. "Development and use of a lithium-metal reference electrode in aging studies of lithium-ion batteries" ECS; 2014; 161 (6) A1116-A1126.

User Manual (Release 2.4) for "ECC-Ref" Electrochemical test cell with reference electrode, from EL-CELL GmbH, Hamburg, Germany, 16 pages (2016).

\* cited by examiner

THREE-ELECTRODE TEST CELL

BACKGROUND

Secondary, or rechargeable, lithium-based batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

Test cells are often used to study the characteristics (e.g., voltage, impedance, etc.) of lithium-based batteries so that those characteristics may be quantified and improved. In some test cells, a reference electrode is used to help measure the characteristics of the battery. For example, a reference electrode may be added to a test cell to help measure the voltage of a lithium-based battery by providing a potential against which the potentials of the negative electrode and the positive electrode can be measured.

SUMMARY

An example of a three-electrode test cell includes a negative electrode, a positive electrode having an aperture defined therein, a reference electrode, and a first microporous polymer separator soaked in an electrolyte. The reference electrode is disposed within the aperture of the positive electrode and is physically separated from the positive electrode. The first microporous polymer separator is disposed between the negative electrode and the positive electrode.

In an example of a method for simultaneously testing voltage potentials of a negative electrode and voltage potentials of a positive electrode over time, a three-electrode test cell is provided. The three-electrode test cell includes a negative electrode, a positive electrode having an aperture defined therein, a reference electrode, and a first microporous polymer separator soaked in an electrolyte. The reference electrode is disposed within the aperture of the positive electrode and is physically separated from the positive electrode. The first microporous polymer separator is disposed between the negative electrode and the positive electrode. At least one voltmeter is provided, and the negative electrode, the positive electrode, the reference electrode, and the at least one voltmeter are electrically connected.

BRIEF DESCRIPTION OF THE DRAWINGS

Features of examples of the present disclosure will become apparent by reference to the following detailed description and drawings.

DETAILED DESCRIPTION

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted (e.g., intercalated, alloyed, etc.) into the negative electrode, and during discharging, lithium ions are extracted from the negative electrode. Each of the electrodes is also associated with respective current collectors, which are connected by an interruptible external circuit that allows an electric current to pass between the negative and positive electrodes. Examples of lithium-based batteries include a lithium sulfur battery (i.e., includes a sulfur based positive electrode paired with a lithium or lithiated negative electrode), a lithium ion battery (i.e., includes a lithium based positive electrode paired with a negative electrode or a non-lithium positive electrode paired with a lithium or lithiated negative electrode), and a lithium metal battery (i.e., includes lithium based positive and negative electrodes).

Test cells may be used to study the characteristics (e.g., voltage, impedance, etc.) of lithium-based batteries. Test cells may have a two-electrode configuration or a three-electrode configuration. The three-electrode cell configuration generally includes a reference electrode in addition to the negative electrode (i.e., counter electrode) and the positive electrode (i.e., working electrode).

In some examples, the reference electrode provides a potential against which the potentials of the negative electrode and the positive electrode can be measured. The reference electrode should be sufficiently stable in the electrolytic environment by not contributing to the reaction in the system, and should also provide a known and table thermodynamic potential over the period of use. With the use of three potential probes connected to the respective electrodes, the potential of each of the negative electrode and the positive electrode may be measured at the same time against the known potential of the reference electrode.

In other examples, the reference electrode may act as a positive electrode with respect to the negative electrode (i.e., during discharging it accepts lithium ions from the negative electrode), and as a negative electrode with respect to the positive electrode (i.e., during discharging it donates lithium ions to the positive electrode). With the use of two potential probes, the potential across the connected electrodes may be measured.

Traditional three-electrode cells place the reference electrode between the negative electrode and the positive electrode, often within the separator. These traditional three-electrode cells may require the separator to be a particular material (e.g., glassfiber) and/or to have a particular thickness (e.g., at least 0.9 mm thick). These traditional three-electrode cells may also require the reference electrode to be in a particular form (e.g., a wire) and/or may require a special tool to insert the reference electrode. These requirements may increase the cost of these traditional three-electrode cells. Further, because these traditional three-electrode cells can be expensive, it is desirable that they are reusable. To make the cells reusable, the material used to seal the cells may be weak enough that it may be broken/removed and replaced during subsequent uses. However, such a weak seal may allow air to leak into the cell, which may cause these traditional three-electrode cells to be unreliable and/or unable to complete long cycling tests.

Examples of the three-electrode test cell disclosed herein place the reference electrode within an aperture of the positive electrode. Other than being able to be placed within the aperture of the positive electrode, the reference electrode does not have to be in a particular form. Moreover, a special tool is not needed to position the reference electrode within the cell. The separator of the test cell disclosed herein is not limited by a particular material or thickness. The separator may be as thin as 16 μm, in part because the reference electrode in the examples disclosed herein is not inserted into the separator. Thus, the three-electrode test cell disclosed herein may be less expensive and easier to operate then traditional three-electrode cells. Further, the sealing material used in the three-electrode test cell disclosed herein does not allow air to leak into the cell, which enables the cell to perform long cycling tests.

The three-electrode test cell disclosed herein is also a single use device.

Figure 1:
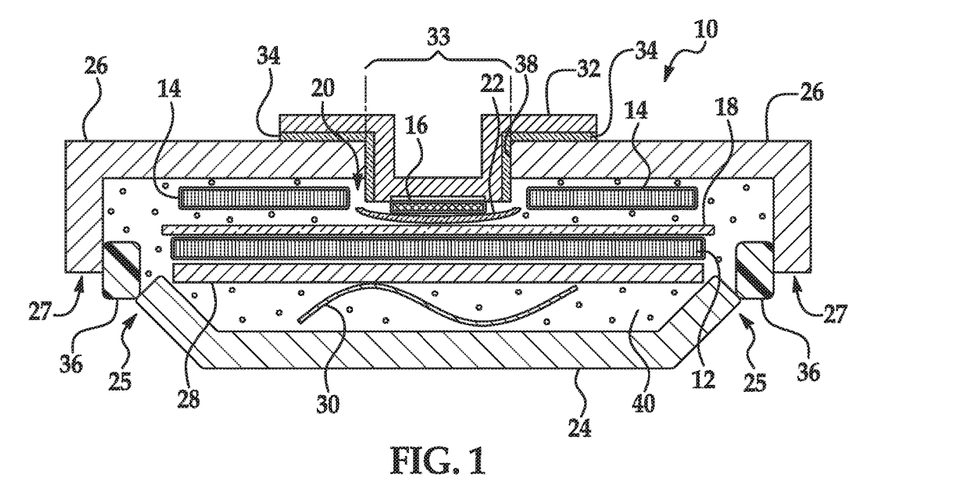
FIG. 1 is a schematic view of an example of a three-electrode test cell.

FIG. 1 illustrates an example of the three-electrode test cell 10. As shown in FIG. 1, the three-electrode test cell 10 includes a negative electrode 12, a positive electrode 14, a reference electrode 16, and a first microporous polymer separator 18. The positive electrode 14 has an aperture 20 defined therein. The reference electrode 16 is disposed within the aperture 20 of the positive electrode 14 and is physically separated from the positive electrode 14. The first microporous polymer separator 18 is soaked in an electrolyte 40 (represented by the speckles) and is disposed between the negative electrode 12 and the positive electrode 14. In some examples, the three-electrode test cell 10 consists of these components, which may be incorporated into a coin cell housing for testing. In some other examples, the three-electrode test cell 10 may include additional components. Examples of additional components that may be included in the three-electrode test cell 10 include a second microporous polymer separator 22, a negative electrode shell 24, a positive electrode shell 26, a spacer 28, a spring 30, a reference electrode current collector 32, an insulating sealing material 34, a plastic ring 36, or combinations of these components. As examples of the combinations, the test cell 10 shown in FIG. 1 may include all of the components shown, with or without the second microporous polymer separator 22.

In any of the examples disclosed herein, the negative electrode 12 (or counter electrode) may include an active material, a binder material, and a conductive filler. Examples of suitable active materials for the negative electrode 12 include any lithium host active material that can sufficiently undergo lithium intercalation and deintercalation, or lithium alloying and dealloying, or lithium insertion and deinsertion, while copper or another current collector functions as the negative terminal of the three-electrode test cell 10. Examples of the lithium host active material include graphite, silicon-based materials, such as silicon alloys, or lithium-based materials. Further examples include tin, alloys of tin, antimony, and alloys of antimony. Graphite exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Examples of the silicon-based active material include crystalline silicon, amorphous silicon, silicon oxide ($SiO_x$), silicon alloys (e.g., Si—Sn), etc. The silicon active material may be in the form of a powder, particles, etc. ranging from nano-size to micro-size. Examples of the lithium-based materials include lithium foil, lithium alloys, or lithium titanate. When lithium foil is used, the polymer binder and conductive filler may not be included in the negative electrode 12.

The binder material may be used to structurally hold the active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders include polyvinyl alcohol (PVA), sodium alginate, or other water-soluble binders.

The conductive filler material may be a conductive carbon material. The conductive carbon material may be a high surface area carbon, such as acetylene black or another carbon material (e.g., Super P). The conductive filler material is included to ensure electron conduction between the active material and the negative-side current collector (which may be the negative electrode shell 24) in the test cell 10.

The negative electrode 12 may include up to 90% by total weight (i.e., 90 wt %) of the active material and up to 20% by total weight (i.e., 20 wt %) of each of the conductive filler and binder material. In an example, the negative electrode 12 includes from about 70 wt % to about 90 wt % of the active material, from about 5 wt % to about 15 wt % of the conductive filler material, and from about 5 wt % to about 15 wt % of the binder material.

The negative electrode 12 may be purchased or formed. In an example, the negative electrode 12 may be formed by making a slurry of active material particles, binder material, and conductive filler material in water and/or a polar aprotic solvent (e.g., dimethylacetamide (DMAc), N-methyl-2-pyrrolidone (NMP), dimethylformamide (DMF), dimethylsulfoxide (DMSO), or another Lewis base, or combinations thereof).

The slurry may be mixed, and then deposited onto a support (not shown in FIG. 1). In an example, the support is a negative-side current collector. It is to be understood that the support may be formed from copper or any other appropriate electrically conductive material known to skilled artisans. The support that is selected should be capable of collecting and moving free electrons to and from an external circuit connected thereto. The slurry may be deposited using any suitable technique. As examples, the slurry may be cast on the surface of the support, or may be spread on the surface of the support, or may be coated on the surface of the support using a slot die coater.

The deposited slurry may be exposed to a drying process in order to remove any remaining solvent and/or water. Drying may be accomplished using any suitable technique. Drying may be performed at an elevated temperature ranging from about 60° C. to about 150° C. In some examples, vacuum may also be used to accelerate the drying process. As one example of the drying process, the deposited slurry may be exposed to vacuum at about 120° C. for about 12 to 24 hours. The drying process results in the formation of the negative electrode 12.

If the negative electrode 12 is not formed of lithium and is to be paired with a positive electrode 14 that is also not formed of lithium, the negative electrode 12 may be exposed to a pre-lithiation process prior to incorporating it into the three-electrode test cell 10. The pre-lithiation technique lithiates the negative electrode 12. In an example, the negative electrode 12 may then be pre-lithiated using a half cell. More specifically, the half cell is assembled using the negative electrode 12, which is soaked in a suitable electrolyte, which includes a solvent and a lithium salt. The half cell includes a counter electrode, and a voltage potential is applied to the half cell. The application of the voltage causes lithium metal to penetrate the negative electrode 12. After pre-lithiation is complete, the half cell is disassembled and the pre-lithiated negative electrode 12 may be washed using a suitable solvent, such as DME.

The negative electrode 12 (including lithium as the active material) or the pre-lithiated negative electrode 12 (including graphite or a silicon-based active material) may then be used in the three-electrode test cell 10.

The negative electrode 12 may be paired with several different positive electrodes 14. Depending upon the type of positive electrode 14, the test cell 10 may be considered a lithium sulfur test cell, a lithium ion test cell, or a lithium metal test cell. Each of the positive electrodes 14 will now be described.

Lithium Sulfur Three-Electrode Test Cell 10

In some examples, the three-electrode test cell 10 may be a lithium sulfur test cell. For the lithium sulfur three-electrode test cell 10, any example of the negative electrode 12 previously described may be used.

When the three-electrode test cell 10 is a lithium sulfur test cell, the positive electrode 14 (i.e., working electrode) may include any sulfur-based active material that can sufficiently undergo lithium alloying and dealloying with aluminum or another suitable current collector functioning as the positive terminal of the lithium sulfur electrochemical cell. An example of the sulfur-based active material is a sulfur-carbon composite. In an example, the weight ratio of S to C in the positive electrode 14 ranges from 1:9 to 9:1. The positive electrode 14 in the lithium sulfur three-electrode test cell 10 may include any of the previously mentioned binder materials and conductive fillers.

Lithium Ion Three-Electrode Test Cell 10

In some other examples, the three-electrode test cell 10 may be a lithium ion test cell. For the lithium ion three-electrode test cell 10, any example of the negative electrode 12 previously described may be used. A lithium negative electrode 12 may be utilized in the lithium ion test cell, for example, when the positive electrode 14 is not a lithium based active material.

When the three-electrode test cell 10 is a lithium ion test cell, the positive electrode 14 may include any lithium-based or non-lithium-based active material that can sufficiently undergo lithium insertion and deinsertion with aluminum or another suitable current collector functioning as the positive terminal of the lithium ion battery/three-electrode test cell 10. One common class of known lithium-based active materials suitable for this example of the positive electrode 14 includes layered lithium transition metal oxides. For example, the lithium-based active material may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$ or (M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium-based active materials include $Li(Ni_{1/3}Mn_{1/3}Co_{1/3})O_2$, $Li_{x+y}Mn_{2-y}O_4$ (LMO, 0<x<1 and 0<y<0.1), or a lithium iron polyanion oxide, such as lithium iron phosphate ($LiFePO_4$) or lithium iron fluorophosphate ($Li_2FePO_4F$), or a lithium rich layer-structure. Still other lithium-based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$) or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

Suitable non-lithium based materials for this example of the positive electrode 14 include metal oxides, such as manganese oxide ($Mn_2O_4$), cobalt oxide ($CoO_2$), a nickel-manganese oxide spinel, a layered nickel-manganese-cobalt oxide, or an iron polyanion oxide, such as iron phosphate ($FePO_4$) or iron fluorophosphate ($FePO_4F$), or vanadium oxide ($V_2O_5$).

The positive electrode 14 in the lithium ion battery/three-electrode cell 10 may include any of the previously mentioned binder materials and conductive fillers.

Lithium Metal Three-Electrode Test Cell 10

In still some other examples, the three-electrode test cell 10 may be a lithium metal test cell. In these examples, the negative electrode 12 is lithium or a lithium-alloy, and the positive electrode 14 includes a lithium-based active material. Any of the previous lithium-based active materials may be used in the lithium metal three-electrode test cell 10, an example of which includes $LiFePO_4$. The negative electrode 12 and/or positive electrode 14 in the lithium metal three-electrode test cell 10 may include any of the previously described conductive fillers and/or binders. However, when lithium foil is utilized, such additives may not be included.

In each of the above examples (i.e., when the three-electrode test cell 10 is a lithium sulfur test cell, a lithium ion test cell, or a lithium metal test cell and the positive electrode 14 includes the corresponding active material), the positive electrode 14 has an aperture 20 defined therein. The aperture 20 extends through the thickness of the positive electrode 14 so that the electrolyte 40 may flow through the aperture 20. The aperture 20 may be placed through any portion of the positive electrode 14. In the example shown in FIG. 1, the aperture 20 is positioned at or near the center of the positive electrode 14. The aperture 20 may also be any size or shape, as long as the reference electrode 16 may be disposed within the aperture 20 and physically separated from the positive electrode 14. In an example, the aperture 20 may have one dimension that is from about 1.5X to about 2.5X, where X is a corresponding dimension of the reference electrode 16. For example, both the aperture 20 and the reference electrode 16 may be circular in shape, and the radius of the aperture 20 may be from about 1.5X to about 2.5X, where X is the radius of the reference electrode 16. For another example, both the aperture 20 and the reference electrode 16 may be rectangular in shape, and the length of the aperture 20 may be from about 1.5X to about 2.5X, where X is the length of the reference electrode 16. In still another example, the aperture 20 may have one dimension that is about 2X, where X is a corresponding dimension of the reference electrode 16. In the example shown in FIG. 1, the aperture 20 is located in the center of the positive electrode 14, and is a circular aperture with a radius about twice the size of the radius of the circular reference electrode 16.

The positive electrode 14 may be purchased or formed. In an example, the positive electrode 14 may be formed using a method similar to the method described above for forming the negative electrode 12, i.e., by making a slurry of active material particles, binder material, and conductive filler material in water and/or a polar aprotic solvent. The slurry may be mixed, and then deposited onto a support. In an example, the support is the positive-side current collector. The slurry may be deposited and/or dried by any technique described above in reference to the formation of the negative electrode 12. Additionally, the slurry may be selectively deposited so the positive electrode 14 has the aperture 20 therein. Alternatively, the aperture 20 may be formed (e.g., drilled) in the positive electrode 14 after the slurry has been deposited and dried.

As mentioned above, any example of the three-electrode test cell 10 also includes the reference electrode 16. The reference electrode 16 may include any of the previous lithium-based active materials, such as lithium metal, or LiFePO$_4$. The reference electrode 16 may also include Li$_4$Ti$_5$O$_{12}$ (LTO) as the lithium-based active material. The reference electrode 16 may include any of the previously described conductive fillers and/or binders. However, when lithium foil is utilized, such additives may not be included.

The reference electrode 16 may be small enough that it may be disposed within the aperture 20 of the positive electrode 14 and physically separated (and electrically isolated) from the positive electrode 14. As such, the size and shape of the reference electrode 16 depends, at least in part, on the size and shape of the aperture 20. In an example, the reference electrode 16 may have a dimension (e.g., radius, diameter, length, or width) that is from about 0.667Y to about 0.4Y, where Y is a corresponding dimension of the aperture 20. For example, both reference electrode 16 and the aperture 20 may be circular in shape, and the radius of the reference electrode 16 may be from about 0.667Y to about 0.4Y, where Y is the radius of the aperture 20. In another example, the reference electrode 16 may have a dimension (e.g., radius, diameter, length, or width) that is about 0.5Y, where Y is a corresponding dimension of the aperture 20. For example, the positive electrode 14, the reference electrode 16, and the aperture 20 may be circular in shape, the positive electrode 14 may have a diameter of about 13 mm (6.5 mm radius), the reference electrode 16 may have a diameter of about 2 mm (1 mm radius), and the aperture 20 may have a diameter of about 4 mm (2 mm radius). Moreover, the thickness of the reference electrode 16 is equal to or less than the thickness of the positive electrode 14.

As mentioned above, the reference electrode 16 is disposed within the aperture 20 of the positive electrode 14 such that it is physically separated from the positive electrode 14. This configuration allows at least some standard electrochemical cell parts to be used in the three-electrode test cell 10, while also allowing the lithium ions to travel through the electrolyte 40 between the positive and negative electrodes 14, 12. In some examples, any or all of the negative electrode 12, reference electrode 16, the first microporous polymer separator 18, the second microporous polymer separator 22, the negative electrode shell 24, the spacer 28, the spring 30, the reference electrode current collector 32, and the plastic ring 36 may be standard electrochemical cell parts. For example, these parts may be the size of standard coin cell parts. Additionally, the positive electrode 14 and the positive electrode shell 26 may be purchased or formed as standard parts and then modified to have the appropriate apertures 20, 38 therein. For example, these parts of the three-electrode test cell 10 may be the standard sizes that correspond to a 2032 type coin cell. The positive electrode 14 and the negative electrode 12 may each be circular and may each have a diameter of about 13 mm. The positive electrode shell 26 and the first microporous polymer separator 18 may each be circular, and the internal diameter of the positive electrode shell 26 and the diameter of the first microporous polymer separator 18 may be about 20 mm. The use of standard electrochemical cell parts may allow the three-electrode test cell 10 to be less expensive than if custom parts where required.

The three-electrode test cell 10 also includes the first microporous polymer separator 18. The first microporous polymer separator 18 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available microporous separators 18 include single layer polypropylene membranes, such as CELGARD 2400 and CELGARD 2500 from Celgard, LLC (Charlotte, N.C.). It is to be understood that the first microporous separator 18 may be coated or treated, or uncoated or untreated. For example, the first microporous separator 18 may or may not be coated or include any surfactant treatment thereon.

In other examples, the first microporous separator 18 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the first microporous separator 18 is poly(p-hydroxybenzoic acid). In yet another example, the first microporous separator 18 may be chosen from a combination of the polyolefin (such as PE and/or PP) and one or more of the other polymers listed above.

The first microporous separator 18 may be a single layer or may be a multi-layer (e.g., bilayer, trilayer, etc.) laminate fabricated from either a dry or wet process. For example, a single layer of the polyolefin and/or other listed polymer may constitute the entirety of the first microporous polymer separator 18. As another example, however, multiple discrete layers of similar or dissimilar polyolefins and/or polymers may be assembled into the first microporous polymer separator 18. In one example, a discrete layer of one or more of the polymers may be coated on a discrete layer of the polyolefin to form the first microporous polymer separator 18. Further, the polyolefin (and/or other polymer) layer, and any other optional polymer layers, may further be included in the first microporous polymer separator 18 as a fibrous layer to help provide the first microporous polymer separator 18 with appropriate structural and porosity characteristics. Still other suitable first microporous polymer separators 18 include those that have a ceramic layer attached thereto, and those that have ceramic filler in the polymer matrix (i.e., an organic-inorganic composite matrix).

The first microporous separator 18 operates as both an electrical insulator and a mechanical support, is sandwiched between the negative electrode 12 and the positive electrode 14 to prevent physical contact between the two electrodes 12, 14 and the occurrence of a short circuit. The first microporous separator 18 also electrically isolates the negative electrode 12 form the reference electrode 16. In addition to providing a physical barrier between the electrodes 12, 14 and 12, 16, the first microporous polymer separator 18 ensures passage of lithium ions through the electrolyte 40 filling its pores.

The negative electrode 12, the positive electrode 14, the reference electrode 16 and first microporous separator 18 are soaked with the electrolyte 40. The electrolyte 40 includes a solvent suitable for the three-electrode test cell 10 and a lithium salt.

The solvent(s) included in the electrolyte 40 may be any solvent(s) that is/are capable of dissolving the lithium salt, and may vary, depending upon the type of test cell 10. In an example when the test cell 10 is a lithium ion test cell, the solvent(s) may be an organic solvent or a mixture of organic solvents. In some examples, the solvent(s) may be selected from cyclic carbonates (ethylene carbonate (EC), propylene carbonate (PC), butylene carbonate, fluoroethylene carbonate (FEC)), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), dioxane, acetonitrile, nitromethane, ethyl monoglyme, phosphoric triesters, trimethoxymethane, dioxolane derivatives, 3-methyl-2-oxazolidinone, propylene carbonate derivatives, tetrahydrofuran derivatives, ethyl ether, 1,3-propanesultone, N-methyl acetamide, acetals, ketals, sulfones, sulfolanes, aliphatic ethers, glymes, polyethers, phosphate esters, siloxanes, dioxolanes, N-alkylpyrrolidones, and mixtures thereof. In another example when the test cell 10 is a lithium sulfur test cell, the non-aqueous liquid electrolyte solution may be an ether based solvent. Examples of the ether based solvent include cyclic ethers, such as 1,3-dioxolane (DOL), tetrahydrofuran, 2-methyltetrahydrofuran, and chain structure ethers, such as 1,2-dimethoxyethane (DME), 1-2-diethoxyethane, ethoxymethoxyethane, tetraethylene glycol dimethyl ether (TEGDME), polyethylene glycol dimethyl ether (PEGDME), ethyl ether, aliphatic ethers, polyethers, and mixtures thereof.

Examples of the lithium salt that may be dissolved in the organic solvent(s) or the ether(s) include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or lithium bis(trifluoromethylsulfonyl)imide), $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof.

One specific example of the electrolyte 40 for the lithium ion test cell is 1M $LiPF_6$ in EC/DEC (1:1), and one specific example of the electrolyte 40 for the lithium sulfur test cell is 1M LiTFSI and 0.2M $LiNO_3$ in DOL/DME (1:1).

As shown in FIG. 1, the three-electrode test cell 10 may also include a second microporous separator 22. The second microporous polymer separator 22 may be formed from any of the materials described above in reference to the first microporous separator 18, e.g., a polyolefin. When the second microporous separator 22 is included in the three-electrode test cell 10, it is also soaked in the electrolyte 40.

As shown in FIG. 1, the second microporous polymer separator 22 may be disposed between the negative electrode 12 and the reference electrode 16 and may be concave around the reference electrode 16 so that an edge of the second microporous polymer separator 22 is disposed between the reference electrode 16 and the positive electrode 14. The edge of the second microporous polymer separator 22 may into contact with the edge of the positive electrode 14 that defines the aperture 14. The second microporous separator 22 may operate as an electrical insulator (preventing the occurrence of a short), a mechanical support, and a barrier to prevent physical contact between the positive electrode 14 and the reference electrode 16. The second microporous separator 22 also ensures passage of lithium ions through the electrolyte 40 filling its pores.

The three-electrode test cell 10 may also include a negative electrode shell 24 and a positive electrode shell 26. The negative electrode shell 24 and/or the positive electrode shell 26 may be stainless steel, aluminum, aluminum-coated steel, copper, or any other appropriate electrically conductive material. In some examples of the three-electrode test cell 10, the negative electrode shell 24 acts as the negative-side current collector, and the positive electrode shell 26 acts as the positive-side current collector. When the negative electrode shell 24 and the positive electrode shell 26 act, respectively, as the negative-side current collector and the positive-side current collector, they should be capable of collecting and moving free electrons to and from an external circuit connected thereto. When the negative electrode shell 24 acts as the negative-side current collector, the free electrons may move from the negative electrode 12 through the spacer 28 and the spring 30 to the negative electrode shell 24 and then from the negative electrode shell 24 to the external circuit; and the free electrons may move back from the external circuit to the negative electrode 12 through the negative electrode shell 24, the spring 30, and the spacer 28. When the positive electrode shell 26 acts as the positive-side current collector, the free electrons may move from the positive electrode 14 to the external circuit and back directly through the positive electrode shell 26.

As shown in FIG. 1, in some examples of the three-electrode test cell 10, the negative electrode 12 is disposed between the negative electrode shell 24 and the first microporous polymer separator 18, and the positive electrode 14 is disposed between the positive electrode shell 26 and the first microporous polymer separator 18. In these examples, the negative electrode shell 24 and the positive electrode shell 26 (along with the reference electrode current collector 32) may be the outer most components of the three-electrode test cell 10. In other words, the shells 24, 26 and the reference electrode current collector 32 may form the housing of the test cell 10. In other examples, the test cell 10 may have another housing, which surrounds the shells 24, 26 and the reference electrode current collector 32. In these examples, the housing should include a separate electrical connection to each of the negative electrode shell 24, the positive electrode shell 26, and the reference electrode current collector 32. Whether an additional housing is utilized or not, it is to be understood that the shells 24, 26 and the reference electrode current collector 32 seal the test cell 10.

A plastic ring 36 may be disposed between the end portion 25 of the negative electrode shell 24 and the end portion 27 of the positive electrode shell 26. The plastic ring 36 electrically isolates the two shells 24, 26, and also seals the shells 24, 26 together. For example, when the negative electrode shell 24 and the positive electrode shell 26 are pressed together (not shown in FIG. 1), the end portion 27 of the positive electrode shell 26 may be bent a little bit inwards toward the center of the test cell 10, which may suppress the plastic ring 36 between the shells 24, 26 and seal the three-electrode test cell 10.

When the negative electrode shell 24 and the positive electrode shell 26 are pressed together, the negative electrode shell 24 may be pushed into electrical contact with the negative electrode 12, and the positive electrode shell 26 may be pushed into electrical contact with the positive electrode 14 so that the negative electrode shell 24 and the positive electrode shell 26 may act, respectively, as the negative-side current collector and the positive-side current collector. When the test cell is compressed, the separator 18 maintains electrical isolation between the electrodes 12, 14 and the plastic ring 36 maintains electrical isolations between the shells 24, 26.

In some examples, the three-electrode test cell 10 may also include the spacer 28 and the spring 30 so that the electrodes 12, 14, 16 and/or the separators 18, 22 are properly oriented within the cell 10. More specifically, the spacer 28 and spring 30 push the negative electrode 12 in physical contact with the separator 18, which is pushed in physical contact with the positive electrode 14, which is pushed in physical contact with the positive electrode shell 26. In an example, the spacer 28 and/or the spring 30 may be stainless steel, aluminum, or copper, or any other material that electrically connects the negative electrode 12 to the negative electrode shell 24. As shown in FIG. 1, in some examples of the three-electrode test cell 10, the spacer 28 may be disposed between the negative electrode 12 and the negative electrode shell 24, and the spring 30 may be disposed between the spacer 28 and the negative electrode shell 24. As such, these components 28, 30 allow the negative electrode 12 to be in electrical contact with the negative electrode shell 24.

In some examples, the three-electrode test cell 10 also includes a reference electrode current collector 32. When the three-electrode test cell 10 is assembled and sealed, the reference electrode current collector 32 is in electrical contact with the reference electrode 16. In an example, the reference electrode current collector 32 may be pushed into electrical contact with the reference electrode 16 when the negative electrode shell 24 and the positive electrode shell 26 are pressed together to seal the test cell 10.

The reference electrode current collector 32 may be stainless steel, copper, nickel, or any other appropriate electrically conductive material. The reference electrode current collector 32 should be capable of collecting and moving free electrons to and from an external circuit connected thereto.

In some examples of the three-electrode test cell 10, the reference electrode current collector 32 is affixed to the positive electrode shell 26 with an insulating sealing material 34. The insulating sealing material 34 may be any electrically insulating sealing material. In an example, the insulating sealing material 34 is an epoxy resin-based insulation glue. In one specific example, the insulating sealing material 34 is a polyimide epoxy.

In some examples of the three-electrode test cell 10, the positive electrode shell 26 has an aperture 38 defined therein. The aperture 38 may extend through the thickness of the positive electrode shell 26 and may be at least partially aligned with the aperture 20 in the positive electrode 14.

The positive electrode shell 26 may be formed with the aperture 38 defined therein or the aperture 38 may be formed (e.g., drilled) in the positive electrode shell 26 after the positive electrode shell 26 is formed. Similar to the aperture 20, the aperture 38 may be positioned at any portion of the positive electrode shell 26 and may also be any size or shape. The aperture 38 aligns with at least a portion of the aperture 20, so that the reference electrode current collector 32 positioned at least partially within the aperture 38 is able to contact the reference electrode 16 but is not able to contact the positive electrode 14. As shown in FIG. 1, the aperture 38 may be slightly smaller than the aperture 20.

At least a portion of the reference electrode current collector 32 may be positioned within and extend through the positive electrode shell aperture 38 so that the reference electrode current collector 32 may establish electrical contact with the reference electrode 16. As shown in FIG. 1, the reference electrode current collector 32 may have a grooved portion 33, and the grooved portion 33 may be the portion of the reference electrode current collector 32 that is positioned within the positive electrode shell aperture 38. In some examples, the depth of the groove portion 33 of the reference electrode current collector 32 may correspond to, or be slightly larger than, the thickness of the positive electrode shell 26. While not shown, it is to be understood that the reference electrode current collector 32 may be flat or any other shape. A flat reference electrode current collector 32 may have suitable dimensions to fit into the aperture 38. In the example shown in FIG. 1, the aperture 38 is positioned in/near the center of the positive electrode shell 26, and is a circular aperture with a diameter that is slightly larger than the outer diameter of the grooved portion 33 of the reference electrode current collector 32.

While not shown in FIG. 1, the three-electrode test cell 10 may also include an interruptible external circuit (not shown) that connects at least two of the electrodes 12, 14, 16. The closed external circuit enables a working voltage to be applied across the three-electrode test cell 10. The three-electrode test cell 10 may also support a load device that can be operatively connected to the external circuit. The load device receives a feed of electrical energy from the electric current passing through the external circuit when the three-electrode test cell 10 is discharging. The load device may also be an electrical power-generating apparatus that charges the three-electrode test cell 10. The load device may also be a measuring instrument that may measure a characteristic of the negative electrode 12, the positive electrode 14, and/or the three-electrode test cell 10. While the load device may be any number of known measuring instruments, specific examples include a voltmeter (when measuring a potential difference between two of the electrodes 12, 14, 16) or a potentiostat (when measuring a potential difference between the positive electrode 14 and the reference electrode 16 by injecting current through the negative electrode 12).

The three probes of the potentiostat may be respectively connected to the negative electrode shell 24, the positive electrode shell 26, and the reference electrode current collector 32. For example, a working electrode probe may be electrically connected to the positive electrode shell 26, a counter electrode probe may be electrically connected to the negative electrode shell 24, and the reference electrode probe may be electrically connected to the reference electrode current collector 32. The reading from this configuration will include 2 potentials/voltages, namely the counter electrode voltage (or the potential of the negative electrode 12 versus the reference electrode 16) and the working electrode voltage (or the potential of the positive electrode 14 versus the reference electrode 16).

The two probes of the voltmeter may be respectively connected to any two of the negative electrode shell 24, the positive electrode shell 26, and the reference electrode current collector 32. For example, a working electrode probe may be electrically connected to the positive electrode shell 26 and a counter electrode probe may be electrically connected to the negative electrode shell 24 to obtain a full cell voltage reading. For another example, a working electrode probe may be electrically connected to the positive electrode shell 26 and a reference electrode probe may be electrically connected to the reference electrode current collector 32 to obtain a reading of the potential of the positive electrode 14 versus the reference electrode 32. For still another example, a counter electrode probe may be electrically connected to the counter electrode shell 24 and a reference electrode probe may be electrically connected to the reference electrode current collector 32 to obtain a reading of the potential of the negative electrode 12 versus the reference electrode 32.

The three-electrode test cell 10 generally operates by reversibly passing lithium ions between the negative electrode 12 and the positive electrode 14 (e.g., when three probes are used or when two probes are used and connected to the negative electrode 12 and the positive electrode 14), or one of these electrodes 12 or 14 and the reference electrode 16 (e.g., when two probes are used and one is connected to the reference electrode 16).

In the fully charged state, the potential/voltage of the three-electrode test cell 10 is at a maximum (typically in the range of greater than 0V to 5.0V); while in the fully discharged state, the potential/voltage of the three-electrode test cell 10 is at a minimum (typically in the range 0V to 2.0V). Essentially, the Fermi energy levels of the active materials change during test cell operation, and so does the difference between the positive and negative electrodes 14, 12, known as the full cell potential/voltage. The difference between the positive and reference electrodes 14, 16 and/or the difference between the negative and reference electrodes 12, 16 may also change during test cell operation, depending upon which probes are utilized and which electrodes 12, 14, 16 are utilized. The full cell potential/voltage decreases during discharge, with the Fermi levels getting closer to each other. During charge, the reverse process is occurring, with the full cell potential/voltage increasing as the Fermi levels are being driven apart. During discharge, the external load device enables an electronic current flow in the external circuit with a direction such that the difference between the Fermi levels (and, correspondingly, the cell voltage) decreases. The reverse happens during charging: the charger forces an electronic current flow in the external circuit with a direction such that the difference between the Fermi levels (and, correspondingly, the cell voltage) increases.

At the beginning of a discharge, the negative electrode 12 of the three-electrode test cell 10 contains a high concentration of intercalated lithium while the positive electrode 14 is relatively depleted. When the negative electrode 12 contains a sufficiently higher relative quantity of intercalated lithium, the three-electrode test cell 10 can generate a beneficial electric current by way of reversible electrochemical reactions that occur when the external circuit is closed to connect the negative electrode 12 and the positive electrode 14. The establishment of the closed external circuit under such circumstances causes the extraction of intercalated lithium from the negative electrode 12. The extracted lithium atoms are split into lithium ions and electrons as they leave an intercalation host at the negative electrode-electrolyte interface.

The chemical potential difference between the positive electrode 14 and the negative electrode 12 (ranging from greater than 0V to about 5.0V, depending on the exact chemical make-up of the electrodes 12, 14) drives the electrons produced by the oxidation of intercalated lithium at the negative electrode 12 through the external circuit towards the positive electrode 14. The lithium ions are concurrently carried by through the electrolyte 40 towards the positive electrode 14. The electrons flowing through the external circuit and the lithium ions migrating across the first microporous polymer separator 18 in the electrolyte 40 eventually reconcile and form intercalated lithium at the positive electrode 14. The electric current passing through the external circuit can be harnessed and directed through the load device until the level of intercalated lithium in the negative electrode 12 falls below a workable level.

The three-electrode test cell 10 may be recharged after a partial or full discharge of its available capacity. To charge the three-electrode test cell 10 an external battery charger is connected to the positive and the negative electrodes 14, 12, to drive the reverse of battery discharge electrochemical reactions. During recharging, the electrons flow back towards the negative electrode 12 through the external circuit, and the lithium ions are carried by the electrolyte 40 across the first microporous polymer separator 18 in the electrolyte 40 back towards the negative electrode 12. The electrons and the lithium ions are reunited at the negative electrode 12, thus replenishing it with intercalated lithium for consumption during the next discharge cycle.

When the negative electrode 12 and the reference electrode 16 are connected via the external circuit (without any connection to the positive electrode 14), the reference electrode 16 may act as the positive electrode 14 does in relation to the negative electrode 12. Similarly, when the positive electrode 14 and the reference electrode 16 are connected via the external circuit (without any connection to the negative electrode 12), the reference electrode 16 may act as the negative electrode 12 does in relation to the positive electrode 14. In these examples, the potential of the reference electrode 16 is stable and known, and the reference electrode is used as a half cell, which allows the potential of the other half cell to be determined.

Moreover, the size and shape of the three-electrode test cell 10, as well as the design and chemical make-up of its main components, may vary depending on the particular application for which it is designed. In an example, the components of the three-electrode test cell 10 are purchased or formed so that they will fit into a standard sized coin cell, such as a 2032 type coin cell or a 2016 type coin cell. When the three-electrode test cell 10 is a 2032 type coin cell, the diameter of the positive electrode shell 26 may be about 20 mm, and the thickness of the cell 10 (i.e., the distance from the bottom of the negative electrode shell 24 to the top of the positive electrode shell 26) may be about 3.2 mm. When the three-electrode test cell 10 is a 2016 type coin cell, the diameter of the positive electrode shell 26 may be about 20 mm, and the thickness of the cell 10 may be about 1.6 mm.

As shown in FIG. 1, the negative electrode 12 and the positive electrode 14 may be circular discs. While not shown, the electrodes 12, 14 may also be any other shape (e.g., rectangular orthotope). When the three-electrode test cell 10 is either a 2032 type coin cell or a 2016 type coin cell, the negative electrode 12 and the positive electrode 14 may have a diameter of about 20 mm or less. In an example, the diameters of the electrodes 12, 14 range from about 10 mm to about 15 mm. In another example, the diameter of the each of the electrodes 12, 14 is about 13 mm.

The first microporous separator 18 may also be purchased or formed so that it will fit into a standard sized coin cell. In an example, the first microporous polymer separator 18 has a thickness ranging from about 16 µm to about 25 µm. As shown in FIG. 1, the first microporous separator 18 may be a circular disc. While not shown, the first microporous separator 18 may also be any other shape. In an example, the first microporous separator 18 has the same shape as the negative electrode 12 and/or the positive electrode 14. In another example, the first microporous separator 18 may have a diameter or length that is the same as or slightly longer than the diameter or length of the negative electrode 12 and/or the positive electrode 14.

Electrochemical impedance spectroscopy (EIS) may be used to measure the imaginary versus real impedance for each of the negative electrode 12, the positive electrode 14, and the full cell 10. For the test cell 10 disclosed herein, the sum of the positive electrode EIS results and the negative electrode EIS results is equal to the full cell EIS results. The sum of the positive electrode EIS results and the negative electrode EIS results being equal to the full cell EIS results verifies that accurate measurements are being obtained using the test cell 10. Thus, the three-electrode test cell 10 may be used to simultaneous test a characteristic of the negative electrode 12 and the same characteristic of the positive electrode 14.

Examples of a method for simultaneously testing voltage potentials of a negative electrode 12 and voltage potentials of a positive electrode 14 over time include providing a three-electrode test cell 10. The three-electrode test cell 10 provided may be any of the examples of the three-electrode test cell 10 described herein and may include any of the components in any configuration described above in reference to the three-electrode test cell 10. In an example of the method, the three-electrode test cell 10 provided includes the negative electrode 12, the positive electrode 14 having the aperture 20 defined therein, the reference electrode 16, and the first microporous polymer separator 18 soaked in the electrolyte 40. The reference electrode 16 is disposed within the aperture 20 of the positive electrode 14 and is physically separated from the positive electrode 14. The first microporous polymer separator 18 is disposed between the negative electrode 12 and the positive electrode 14. In another example of the method, the three-electrode test cell 10 provided may also include the second microporous polymer separator 22, the negative electrode shell 24 (which may act as the negative-side current collector), the positive electrode shell 26 (which may act as the positive-side current collector), the spacer 28, the spring 30, the reference electrode current collector 32, the insulating sealing material 34, and/or the plastic ring 36.

Examples of the method for simultaneously testing voltage potentials of the negative electrode 12 and voltage potentials of the positive electrode 14 over time also include providing at least one voltmeter or potentiostat, and electrically connecting the negative electrode 12, the positive electrode 14, and/or the reference electrode 16, and the at least one voltmeter or potentiostat. In an example, the potentiostat may have 3 probes, labeled as working, reference, and counter. In this example, the working probe may be connected to the positive electrode shell 26 (when it is acting as the positive-side current collector), the reference probe may be connected to the reference electrode current collector 32, and the counter probe may be connected to the negative electrode shell 24 (when it is acting as the negative-side current collector). As described above, the potentiostat will then read two potentials/voltages, a working potential/voltage and a counter potential/voltage. The working potential/voltage is the potential difference of the positive electrode 14 vs. the reference electrode 16. The counter potential/voltage is the potential difference of the negative electrode 12 vs. the reference electrode 16.

In another example, the voltmeter (multimeter) may have only two probes. When the probes connect the positive electrode shell 26 (when it is acting as the positive-side current collector) and the negative electrode shell 24 (when it is acting as the negative-side current collector), the voltmeter will read the full cell potential/voltage (i.e., the potential difference of the positive electrode 14 vs. the negative electrode 12). When the probes connect the positive electrode shell 26 (when it is acting as the positive-side current collector) and the reference electrode current collector 32, the voltmeter will read the potential difference of the positive electrode 14 vs. the reference electrode 16. When the probes connect the negative electrode shell 24 (when it is acting as the negative-side current collector) and the reference electrode current collector 32, the voltmeter will read the potential difference of the negative electrode 12 vs. the reference electrode 16. When the voltmeter has only two probes, two or three voltmeters may be connected so that multiple potentials/voltages may be read at the same time.

In both of these examples (i.e., when the potentiostat has three probes and when the voltmeter has only two probes), the method may further include monitoring and/or recording the potential/voltage over time.

To further illustrate the present disclosure, an example is given herein. It is to be understood that this example is provided for illustrative purposes and is not to be construed as limiting the scope of the present disclosure.

EXAMPLE

An example of the three-electrode test cell was prepared as shown and described in FIG. 1. A lithium cobalt oxide electrode was used as the positive electrode. A graphite electrode was used as the negative electrode. Lithium metal was used as the reference electrode. The electrolyte was 1M $LiPF_6$ in EC/DEC (1:1).

Figure 2:
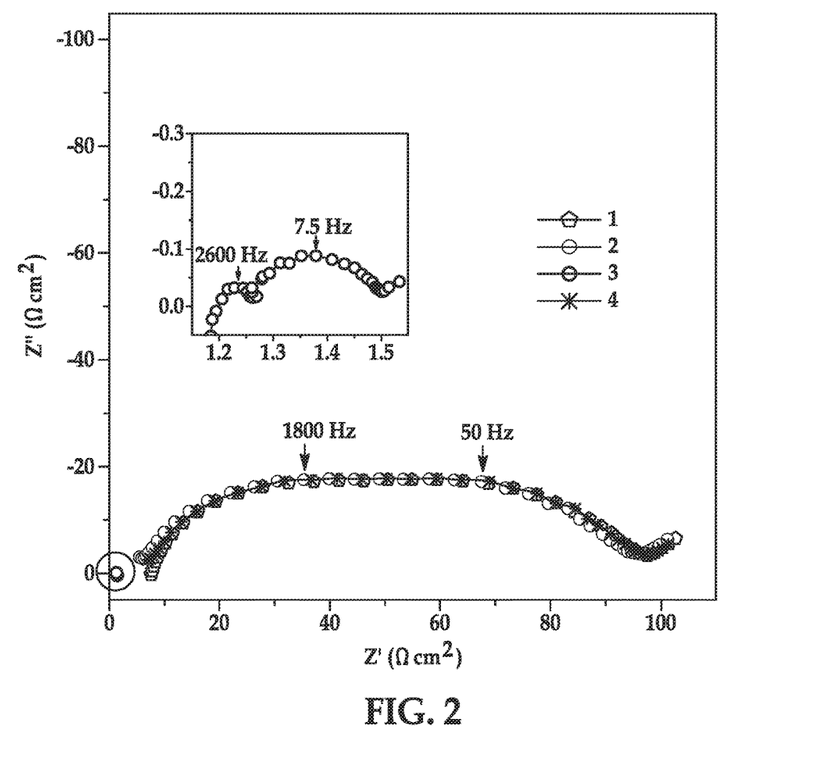
FIG. 2 is a Nyquist plot depicting the imaginary impedance (Y axis) versus the real impedance (X axis) for various components of an example of the three-electrode test cell, where the positive electrode results are labeled 2, the negative electrode results are labeled 3, the full cell results are labeled 1, and the sum of the positive electrode results and the negative electrode results are labeled 4.

A potentiostat with three probes was attached to the example cell. The working probe was connected to the positive electrode shell. The reference probe was connected to the reference electrode current collector, and the counter probe was connected to the negative electrode shell. Electrochemical impedance spectroscopy (EIS) was performed for each of the negative electrode, the positive electrode, and the full example cell. The EIS measurement was performed by a program of the potentiostat. FIG. 2 depicts a Nyquist plot, showing the imaginary impedance (Y axis) versus the real impedance (X axis), for the positive electrode (labeled 2), the negative electrode (labeled 3), and the full cell (labeled 1). FIG. 2 also shows the sum of the positive electrode EIS results and the negative electrode EIS results (labeled 4). As shown in FIG. 2, the sum of the positive electrode EIS results and the negative electrode EIS results is equal to the full cell EIS. Thus, FIG. 2 shows that accurate measurements may be simultaneously obtained for the negative electrode and the positive electrode using the example three-electrode test cell.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 70 wt % to about 90 wt % should be interpreted to include not only the explicitly recited limits of from about 70 wt % to about 90 wt %, but also to include individual values, such as 75 wt %, 82 wt %, 85.2 wt %, etc., and sub-ranges, such as from about 70 wt % to about 80 wt %, from about 75 wt % to about 85 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-electrode test cell, comprising:
   a negative electrode;
   a positive electrode having a first aperture defined therein, the first aperture having a perimeter defining a closed curve such that the positive electrode surrounds the perimeter;
   a reference electrode disposed within the first aperture of the positive electrode and physically separated from the positive electrode;
   a first microporous polymer separator soaked in an electrolyte, the first microporous polymer separator being disposed between the negative electrode and the positive electrode; and
   a second microporous polymer separator soaked in the electrolyte, at least a portion of the second microporous polymer separator being disposed between the negative electrode and the reference electrode, the second microporous polymer separator being concave such that the second microporous polymer separator is disposed around a portion of the reference electrode and an edge of the second microporous polymer separator is disposed between the reference electrode and the positive electrode.

2. The three-electrode test cell as defined in claim 1, further comprising:
   a negative electrode shell, wherein the negative electrode is disposed between the negative electrode shell and the first microporous polymer separator;
   a positive electrode shell, wherein the positive electrode is disposed between the positive electrode shell and the first microporous polymer separator;
   a spacer disposed between the negative electrode and the negative electrode shell; and
   a spring disposed between the spacer and the negative electrode shell.

3. The three-electrode test cell as defined in claim 2, further comprising a reference electrode current collector, wherein the reference electrode current collector is in electrical contact with the reference electrode.

4. The three-electrode test cell as defined in claim 3, further comprising an insulating sealing material affixing the reference electrode current collector to the positive electrode shell.

5. The three-electrode test cell as defined in claim 4 wherein the insulating sealing material is a polyimide epoxy.

6. The three-electrode test cell as defined in claim 3 wherein the positive electrode shell has a second aperture defined therein, and wherein a portion of the reference electrode current collector is positioned within second aperture.

7. The three-electrode test cell as defined in claim 6 wherein the reference electrode current collector has a grooved portion, and wherein the grooved portion of the reference electrode current collector is positioned within the second aperture.

8. The three-electrode test cell as defined in claim 3 wherein the reference electrode current collector includes stainless steel, copper, or nickel.

9. The three-electrode test cell as defined in claim 2, further comprising a plastic ring disposed between the positive electrode shell and the negative electrode shell such that the positive electrode shell is electrically isolated from the negative electrode shell.

10. The three-electrode test cell as defined in claim 1 wherein the reference electrode is a lithium-based reference electrode.

11. The three-electrode test cell as defined in claim 1 wherein the first microporous polymer separator has a thickness ranging from about 16 µm to about 25 µm.

12. The three-electrode test cell as defined in claim 1 wherein a sum of a positive electrode electrochemical impedance spectroscopy (EIS) and a negative electrode electrochemical impedance spectroscopy (EIS) is equal to a full cell electrochemical impedance spectroscopy (EIS).

13. The three-electrode test cell as defined in claim 1 wherein a thickness of the reference electrode is less than or equal to a thickness of the positive electrode.

14. The three-electrode test cell as defined in claim 1 wherein the first aperture is disposed near a center of the positive electrode.

15. The three-electrode test cell as defined in claim 1 wherein the reference electrode has a first dimension and the first aperture has a second dimension, the second dimension being greater than or equal to about 1.5 times to less than or equal to about 2.5 times the first dimension.

16. The three-electrode test cell as defined in claim 1 wherein the positive electrode is substantially circular.

17. The three-electrode test cell as defined in claim 1 wherein the reference electrode is substantially circular and the first aperture is substantially circular.

18. A method for simultaneously testing voltage potentials of a negative electrode and voltage potentials of a positive electrode over time, the method comprising:
   electrically connecting a three-electrode test cell with at least one voltmeter, wherein the three-electrode test cell includes:
   a negative electrode;
   a positive electrode having an aperture defined therein, the aperture having a perimeter defining a closed curve such that the positive electrode surrounds the perimeter;
   a reference electrode disposed within the aperture of the positive electrode and physically separated from the positive electrode;
   a first microporous polymer separator soaked in an electrolyte, the first microporous polymer separator being disposed between the negative electrode and the positive electrode, and
   a second microporous polymer separator soaked in the electrolyte, at least a portion of the second microporous polymer separator being disposed between the negative electrode and the reference electrode, the second microporous polymer separator being concave such that the second microporous polymer separator is disposed around a portion of the reference electrode and an edge of the second microporous polymer separator is disposed between the reference electrode and the positive electrode.

19. The method as defined in claim 18 wherein a sum of a positive electrode electrochemical impedance spectroscopy (EIS) and a negative electrode electrochemical impedance spectroscopy (EIS) is equal to a full cell electrochemical impedance spectroscopy (EIS).

* * * * *